(12) United States Patent
Christmas

(10) Patent No.: US 6,311,469 B1
(45) Date of Patent: Nov. 6, 2001

(54) DRIVE CHAIN

(75) Inventor: Michael Charles Christmas, Cheshire (GB)

(73) Assignee: Renold PLC, Manchester (GB)

( * ) Notice: Subject to any disclaimer, the term of this patent is extended or adjusted under 35 U.S.C. 154(b) by 0 days.

(21) Appl. No.: 09/319,687

(22) PCT Filed: Dec. 10, 1997

(86) PCT No.: PCT/GB97/03408

§ 371 Date: Aug. 2, 1999

§ 102(e) Date: Aug. 2, 1999

(87) PCT Pub. No.: WO98/26199

PCT Pub. Date: Jun. 18, 1998

(30) Foreign Application Priority Data

Dec. 10, 1996 (GB) .................................................... 9625672
Jan. 22, 1997 (GB) .................................................... 9701262
Dec. 2, 1997 (GB) .................................................... 9725425

(51) Int. Cl.[7] ................................................... F16G 13/00
(52) U.S. Cl. ........................... 59/78; 59/4; 59/5; 474/220; 474/221
(58) Field of Search ........................ 59/78, 4, 5; 474/219, 474/220, 221, 224, 225

(56) References Cited

U.S. PATENT DOCUMENTS

| 845,040 | * | 2/1907 | Martin | 474/220 |
|---|---|---|---|---|
| 1,402,766 | * | 1/1922 | Hay | 474/221 |
| 1,660,354 | * | 2/1928 | Phelps | 474/220 |
| 1,737,823 | * | 12/1929 | Bodle | 474/221 |
| 2,068,862 | * | 1/1937 | Lee | 474/221 |
| 2,241,820 | | 5/1941 | Kohn | 74/257 |
| 2,246,810 | * | 6/1941 | Nicolai | 474/221 |
| 2,452,242 | * | 10/1948 | Johnson | 474/224 |
| 2,458,935 | * | 1/1949 | Forbes | 474/221 |
| 2,476,852 | * | 7/1949 | Forbes | 474/220 |
| 2,548,951 | * | 4/1951 | Crane | 474/224 |

FOREIGN PATENT DOCUMENTS 295 14 700 U 11/1995 (DE).
0 652 389 A 5/1995 (WO).

* cited by examiner

*Primary Examiner*—David Jones
(74) *Attorney, Agent, or Firm*—Akin Gump Strauss Hauer & Feld, LLP

(57) ABSTRACT

A drive chain has opposed pairs of inner link plated that are interconnected by cast outer links. Pins pass through aligned apertures in overlapping end portions of the inner and outer links. Each pin is fixed relative to the inner link. The outer link has open or blind bores that receive end portions of the pins in a pivotal relationship. A bearing area is defined between the outer surface of the pin and an inner surface of the outer link bore. The provision of a bearing area in the outer link makes maintenance and sealing easier.

19 Claims, 3 Drawing Sheets

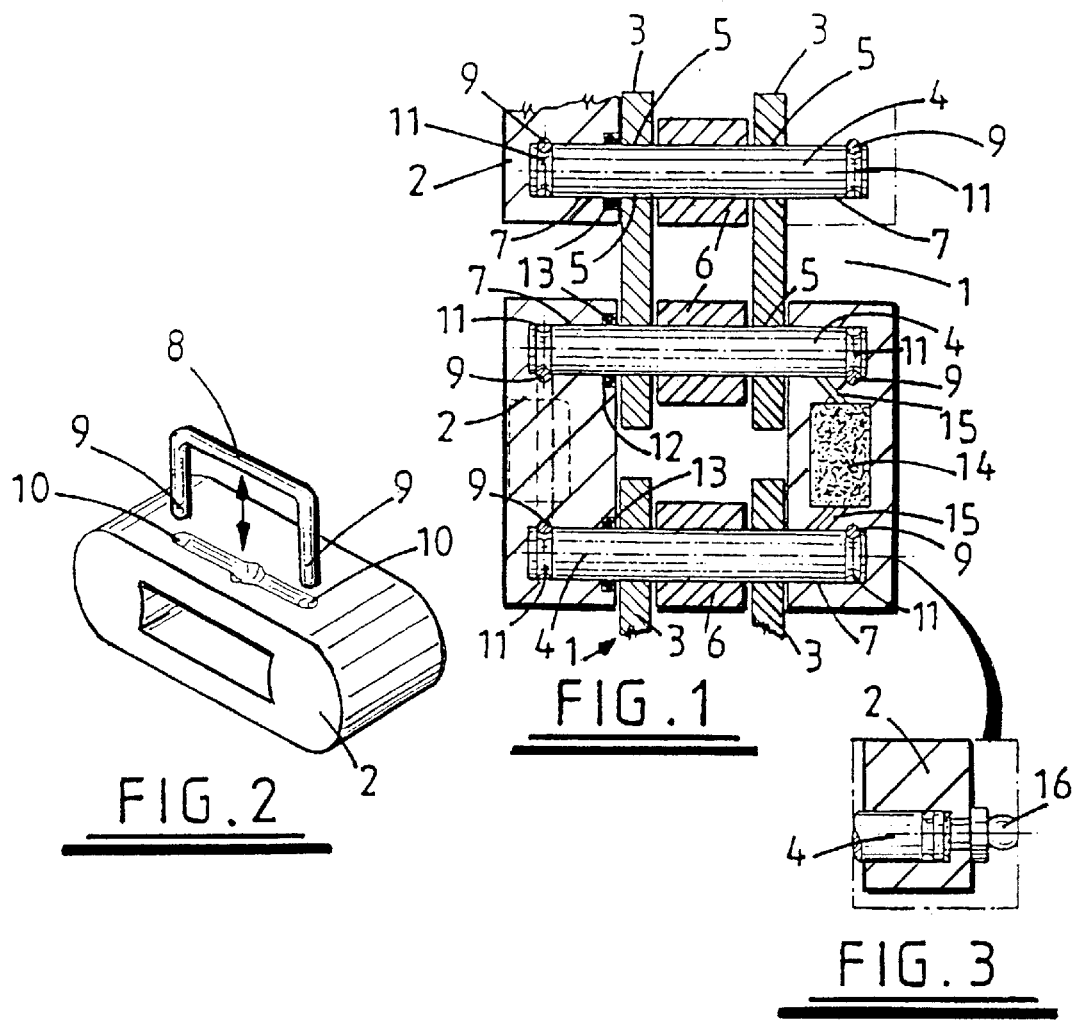

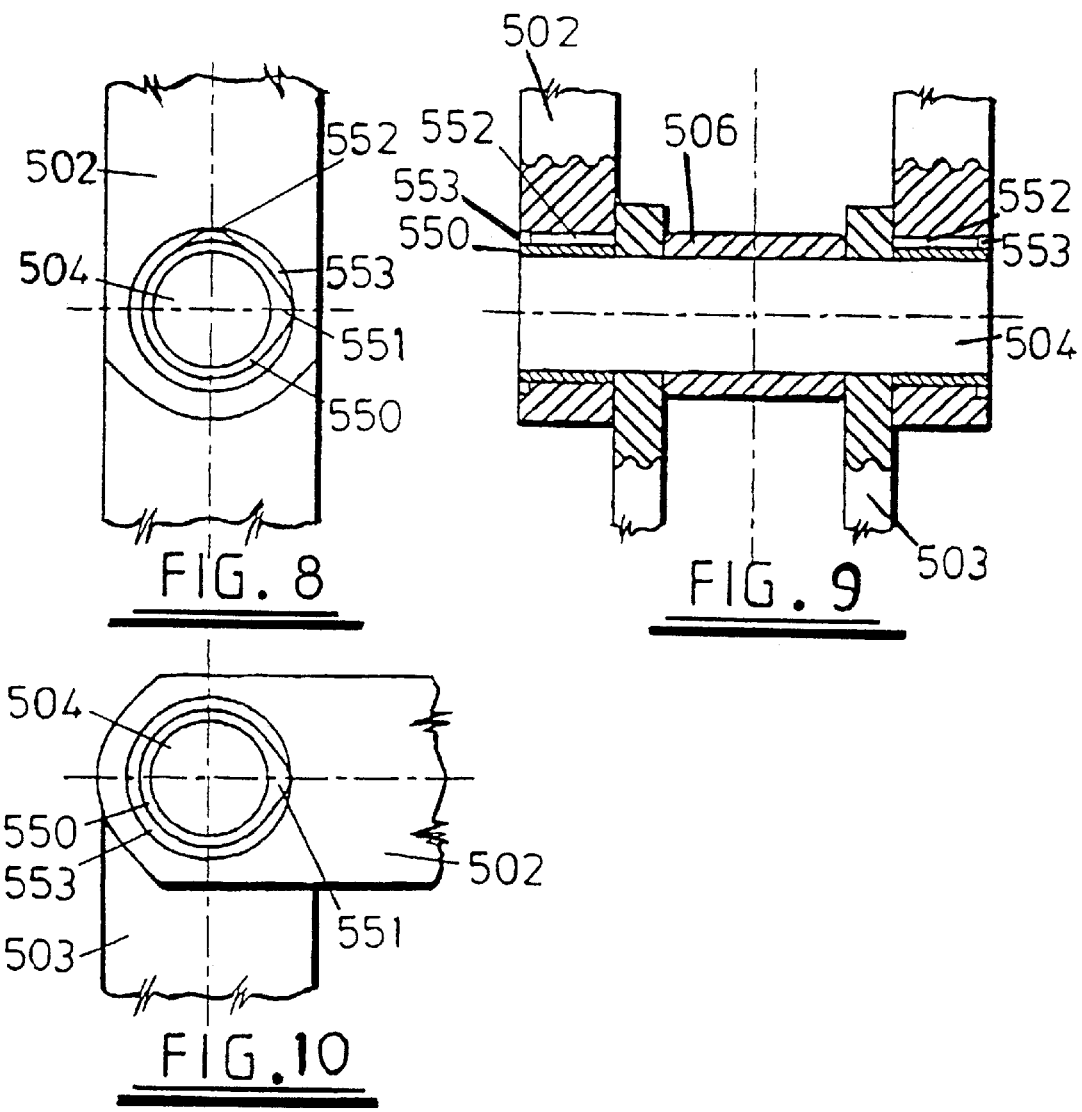

DRIVE CHAIN

CROSS REFERENCE TO RELATED APPLICATIONS

This application claims priority to: PCT patent application No. PCT/GB/03408, filed Dec. 10, 1997; Great Britain Application No. 9725425.4, filed Dec. 2, 1997; Great Britain Application No. 9701262.9, filed Jan. 22, 1997; and Great Britain Application No. 9625672.2, filed Dec. 10, 1996.

BACKGROUND OF THE INVENTION

SUMMARY OF THE INVENTION

The present invention relates to a drive chain and more particularly, but not exclusively to a roller-type chain.

A conventional roller chain comprises pairs of opposed inner link plates interspersed along the length of the chain by pairs of opposed outer link plates. Each outer link overlies the adjacent ends of neighbouring inner links such that an aperture at each end of the outer link is aligned with a corresponding aperture in the end of the underlying inner link plate. The inner and outer link plates are interconnected on opposite sides of the chain by means of a pin that passes through the aligned apertures on each side. The pin is fixed at each end to the opposed outer link plate but is pivotal relative to the inner link plates within a bush that extends between opposed apertures in the inner link plates.

A problem with most drive chains of this type is deterioration owing to wear in the bearing surface between the bush and the pin. In particular, the location of the bearing surface in the middle of the chain makes it difficult to seal effectively against contamination. Alternatively, when it is possible to provide effective sealing the bearing surface is generally difficult to access for maintenance or lubrication purposes.

It is an object of the present invention to obviate or mitigate the aforesaid disadvantages.

According to the present invention there is provided a drive chain having opposed pairs of inner link plates, each inner link plate being connected to an adjacent outer link by means of at least one pin that passes through overlapping portions of the respective links, wherein each outer link has at least one bore that receives an end portion of the pin and is pivotally retained thereon, and wherein a bearing is defined between an outer surface of the pin and an inner surface of the outer link bore, characterised in that the outer link is releasably retained on the pin by means of a fixing member that is designed to be received in a corresponding recess in the outer link.

In a preferred embodiment the pin is received in a blind bore in the outer link in which case the outer link may be releasably retained on the pin by means of a fixing member that is removably housed in the outer link and is engageable in a groove or slot defined on the pin. Lateral movement of the outer link relative to the pin in the direction of the longitudinal axis of the pin is thereby prevented. Preferably the fixing member comprises a staple having legs that are releasably housed in apertures in the outer link and are engageable in the groove or slot on the pin. When the staple is not present the apertures may also be used to convey lubricant to the bearing.

Alternatively the fixing member may be provided entirely within the bore. For example, the fixing means may comprise a split collar having ends that engage in slots or groove provided in the pin and the blind bores to prevent lateral movement of the outer link relative to the pin in the direction of the longitudinal axis of the pin.

Preferably the bearing is provided with at least one seal to prevent egress of lubrication. The seal may for example be an O-ring housed in an annular groove provided in the pin or the blind bores.

The outer link is preferably cast and may have an internal reservoir for lubricant that is fed to the bearing. Alternatively lubricant may be supplied to the bearing via a grease nipple or the like.

Preferably the pin is fixedly connected to the inner link plate by means of an interference fit.

BRIEF DESCRIPTION OF THE DRAWINGS

Specific embodiments of the present invention will now be described by way of example only, with reference to the accompanying drawings in which:

FIG. 1 is a sectioned plan view of a first embodiment of a drive chain according to the present invention;

FIG. 2 is a perspective view of an outer link of FIG. 1;

FIG. 3 is a scrap view of alternative lubrication means for the chain of FIGS. 1 and 2;

FIG. 8 is a scrap side view of further alternative embodiments of the present invention;

FIG. 9 is a sectioned view along line Q—Q of FIG. 10; and

FIG. 10 is a side view corresponding to FIG. 8. with the outer link rotated through 90° to permit assembly.

DETAILED DESCRIPTION OF THE INVENTION

Figure 5:
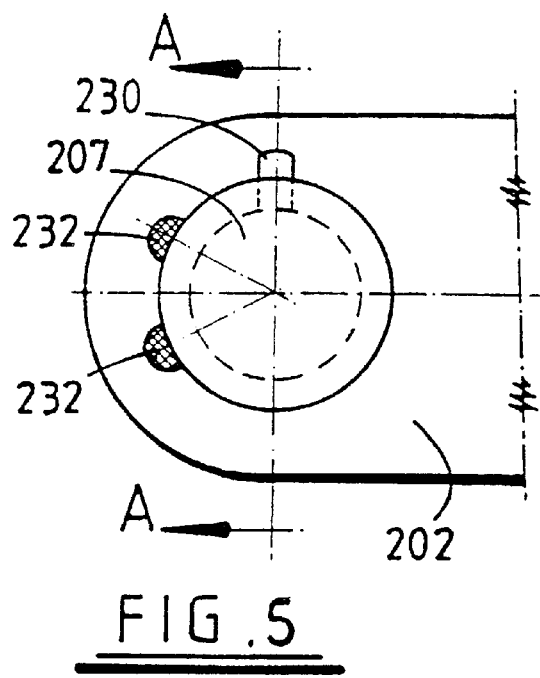
FIG. 5 is a schematic view of the outer link of FIG. 4 shown after insertion of bearings and machining.
Figure 4:
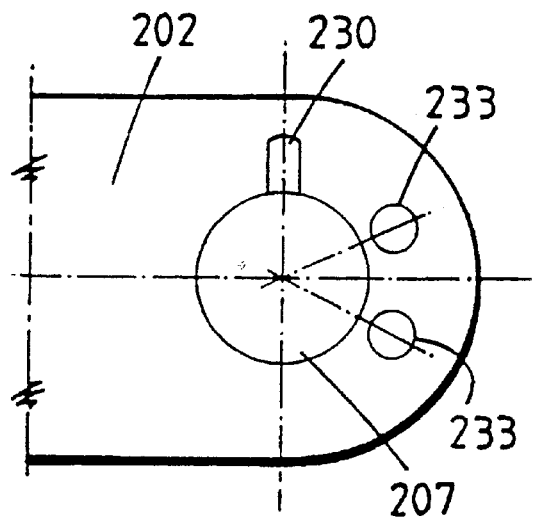
FIG. 4 is a schematic side view of a third embodiment of half of an outer link of a drive chain according to the present invention, shown before machining.

Referring now to the drawings, FIG. 1 shows a fragment of a roller drive chain for engagement with a sprocket (not shown) in a conventional manner.

The chain comprises a plurality of inner link assemblies indicated generally by arrow 1 and interconnected by outer links 2. Each inner link assembly 1 comprises a pair of opposed inner link plates 3 connected by a pair of spaced parallel pins 4 that pass through aligned apertures 5 in opposite inner link plates 3. Each pin 4 is an interference fit with the inner link plate apertures 5. Freely supported on each pin 4 in a region between the inner link plates 3 is a cylindrical roller 6. In use the teeth of the sprocket (not shown) engage between adjacent roolers 6 in the conventional way.

Each oouter link 2 is a casting having two blind bores 7 which each receive an end portion of a pin 4 from an inner link assembly 1. Each outer link 2 receives two pins 4, one from each adjacent inner link assembly 1 thereby connecting them together. The outer link 2 is pivotally moveable relative to each pin 4 and is retained thereon by means of a staple 8 whose ends 9 pass through bores 10 in the casting and engage in an annular groove 11 formed on the end of the pin 4. The outer link 2 is therby prevented from moving relative to the pins 4 in the direction of the longitudinal axes of the pins 4. Alternative means of retaining the outer links 2 on the pins 4 may be used as described below.

The interior surface of each blind bore 7 in the outer link 2 forms a bearing area with the adjacent outer surface of the pin 4. The bearing area may be supplied wiht lubricant by various means (examples are described below) and the lubricant is sealed by means of one or more O-rings 12 that are each seated in an annular groove 13 formed in the blind bore 7. Not only does the O-ring seal 12 prevent egress of the lubricant but is also prevents ingress of dirt or other contaminants.

In the above described design lubrication may be provided during a maintenance cycle when the chain is not in use. In such a cycle the chain is indexed past a lubricant station (not shown) where for each outer link 2 the staple 8 is removed and oil (or othe suitable lubricant) is dispensed to the bearing area through the bores 10. The staple 8 is then replaced and the chain is indexed by one outer link 2 and the procedure is repeated for each link in the chain. The arrangement is particularly suitable for applications where the chain has periods of non-use such as for example drive chains for amusement rides or roller-coasters that close down at night.

In an alternative design of chain lubrication for the bearing area is provided from an interior reservoir 14 formed in the outer link casting 2 (shown in the right-hand outer link of FIG. 1). The lubricant is supplied to the bearing area via lubrication bores 15 connected to the reservoir 14. In a further alternative (shown in FIG. 3) a grease nipple 16 is provided for manual or automatic lubrication.

A further alternative design is shown in FIGS. 6 to 9, in which the outer link 202 is cast with two blind bores 207 each of which has a top slot 230 that extends along the length of the bore 207. Adjacent the closed end of the bore 207 there is an annular groove 231 which is provided for engagement with the pin 204 (as described below). The wall of each blind bore 207 is recessed to receive two bearing materials 232 that extend axially within the bore 207 up to the edge of the annular groove 231.

Figure 6:
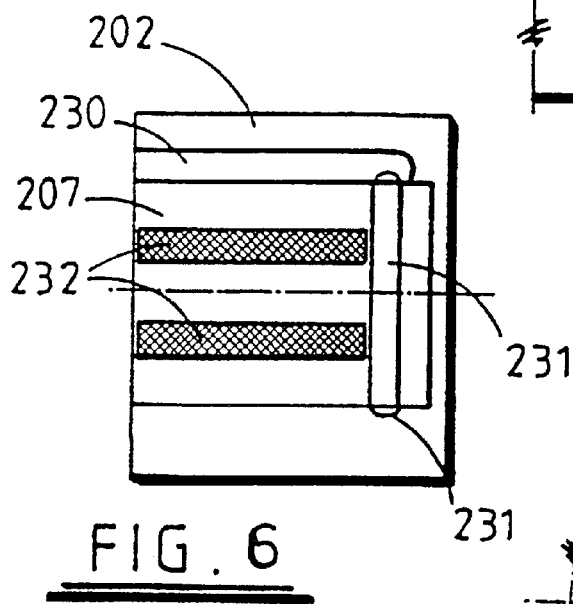
FIG. 6 is a sectioned view along the A—A of FIG. 5.
Figure 7:
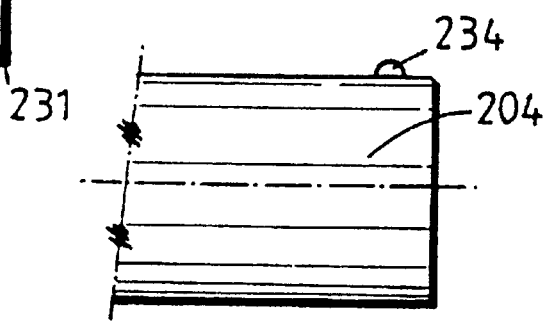
FIG. 7 is a scrap view of an end of a pin for insertion into the outer link of FIG. 5.

The outer link 202 with the blind bores 207 and the axial slot 230 is formed by, for example, casting. Two bearing apertures 233 are then machined adjacent the periphery of each blind bore 207 in a direction parallel therewith. This configuration of the outer link 202 is shown in FIG. 6. Cylindrical rods of bearing material 232 are then inserted into the bearing apertures 233 before each of the blind bores 207 is machined to a larger diameter as shown in FIG. 7. In enlarging the blind bores 207 parts of the cylindrical bearing materials 232 are machined away so that they are flush with the internal surface of the bore 207.

The bearing material 232 may be of a known type that swells when it comes into contact with lubricant. The swelling of the material 232 ensures, in use, a better quality bearing contact with the pin 204.

A nipple or other protrusion 234 is formed on the end of the pin 204 as shown in FIG. 9. The pin 204 is inserted into the blind bore 207 of the outer link 202 with the protrusion 234 aligned with the elongate slot 230. Once the pin 204 is fully inserted it is then twisted relative to the bore 207 so that the protrusion 234 moves out of slot 230 and engages with the groove 231. The outer link 202 is thereby retained on the pin 204.

In a further alternative embodiment, shown in FIGS. 14 to 16, the pin 504 is received in the outer link 502 by annular bush 550 that forms the outer link bearing. The bush 550 has a radially outwardly directed lobe 551 that is of a depth less than the axial length of the bush 550 and is designed to retain the outer link 502 against inner link 503. The pin 504 is an interference fit with the bush 550 and the outer link 502 is free to rotate relative to the bush 550.

In order to allow assembly the outer link aperture 507 has a groove 552 complementary to the lobe 551 on the bush 550. To assemble the chain, the bush 550 is fitted to the pin 504 and the outer link 502 is then presented to the pin and bush assembly such that the lobe 551 is oriented to pass through the groove 552. In this orientation the longitudinal axes of the inner and outer links 503, 502 are at right angles to one another (see FIG. 16). Once the lobe 551 passes through the length of the groove 552 the outer link 502 is rotated through 90° until the longitudinal axes of the links are aligned (see FIG. 14). In this configuration the lobe 551 prevents separation of the inner and outer links 503, 502. The outer link 502 may be countersunk at 553 around its aperture 507 so that the lobe 551 is flush with the outer surface of the link 502.

It will be understood that in the design according to the above embodiments of the present invention the bearing area is positioned in a more accessible place as compared to a conventional roller chain, thereby making sealing and maintenance easier. The material from which the outer link is manufactured can be selected according to the bearing and load requirements for a particular application. The outer link may be manufactured by forging, sintering, pressing, injection moulding or other appropriate means.

It is to be understood that the above described connection arragement between the pin and the outer link bore and the manufacturing method could be used with open bores instead of blind bores.

It will be appreciated that numerous modifications to the above described design may be made without departing from the scope of the invention as defined in the appended claims. For example alternative connections between the outer link and the pins may be used such as a split circular clip or collar fitted in the blind bore of the outer link configuration shown in FIGS. 1 and 2. The ends of the clip are designed to engage in suitable grooves or recesses of the pin and outer link.

Another modification to the designs described is the provision os a separate bush between the outer surface of the pin and in the inner surface of the bores in the outer link to provide a better quality bearing surface. Furthermore the bearing may be a sealed unit with the lubricant being retained therein thereby obviating the need to supply fresh lubricant.

Finally, the O-ring seals 12, 112 may be housed in annular grooves in the pins 4, 104 rather than in the bores 7, 107 or alternatively may be replaced by other suitable equivalents such as lip seals or metal labyrinth seals.

What is claimed is:

1. A drive chain having opposed pairs of inner link plates, each inner link plate being connected to an adjacent outer link by means of at least one pin that passes through overlapping portions of the respective links, wherein each outer link has at least one bore that receives an end portion of the pin and is pivotally retained thereon, and wherein a bearing is defined between an outer surface of the pin and an inner surface of the outer link bore, the outer link being releasably retained on the pin by means of a fixing member that is designed to be received in a corresponding recess in the outer link.

2. A drive chain according to claim 1, wherein the end portion of the pin is received in a blind bore in the outer link.

3. A drive chain according to claim 2, wherein the fixing member is removably housed in the outer link and is engageable in a groove or slot defined on the pin.

4. A drive chain according to claim 3, wherein the fixing member is a staple having legs that are releasably housed in apertures in the outer link and are engageable in the groove or slot on the pin to prevent movement of the outer link in the axial direction of the pin.

5. A drive chain according to claim 4, wherein when the staple is removed the apertures may be used to convey lubricant to the bearing.

6. A drive chain according to claim 2, wherein the outer link bore has a slot defined along at least part of its length and the pin has a protrusion that is engageable in the slot during insertion.

7. A drive chain according to claim 6, wherein the bore has an annular groove which receives the protrusion once the chain is assembled, thereby ensuring the outer link is releasably retained on the pin.

8. A drive chain according to claim 1, wherein the fixing member is provided entirely within the bore.

9. A drive chain according to claim 8, wherein the fixing member is a split collar having ends that engage in slots or grooves provided in the pin and blind bores to prevent movement of the outer link in the axial direction of the pin.

10. A drive chain according to claim 1, wherein the bearing is provided with at least one seal to prevent egress of lubrication.

11. A drive chain according to claim 10, wherein the seal is an O-ring that is housed in an annular groove provided in the pin or blind bores.

12. A drive chain according to claim 10, wherein the seal is an O-ring that is housed in an annular groove provided in the pin or open bores.

13. A drive chain according to claim 1, wherein the outer link is a casting.

14. A drive chain according to claim 1, wherein the outer link has an internal reservoir for lubricant that is fed to the bearing.

15. A drive chain according to claim 1, wherein lubricant is supplied to the bearing via a grease nipple or the like.

16. A drive chain according to claim 1, wherein the pin is fixedly connected to the inner link plate by means of an interference fit.

17. A drive chain according to claim 1, in which bearing material is received in a recess in a wall of the outer link bore.

18. A method of manufacturing a drive chain comprising:

machining at least one bearing aperture in an outer link adjacent a bore;

inserting a bearing material into the bearing aperture; and enlarging the bore until the bearing material is exposed to the bore.

19. A method according to claim 18, wherein the inserting step is accomplished by using a cylindrical rod for the bearing material.

* * * * *